June 2, 1964 N. PRITIKIN 3,135,823

METALLIC ELEMENT EMBEDDING PROCESS AND PRODUCT

Filed June 28, 1960

INVENTOR
Nathan Pritikin

BY Irons, Birch, Swindler, & McKie

ATTORNEYS

United States Patent Office 3,135,823
Patented June 2, 1964

3,135,823

METALLIC ELEMENT EMBEDDING PROCESS AND PRODUCT

Nathan Pritikin, 30 S. Salsipuedes St., Santa Barbara, Calif.

Filed June 28, 1960, Ser. No. 40,992
8 Claims. (Cl. 174—68.5)

This invention relates to a process for producing a conductive metallic pattern in a base support, the surface of the metallic pattern being flush with the base support. More particularly, the invention relates to a process for the production of flush "printed circuits" and the products of such process.

"Printed circuits," although old in the art, have in recent years become widely employed by the electrical and electronic industries. Perhaps the most popular "printed circuit" currently in use is the so-called etched circuit disclosed at least as early as 1936 in British Patents 327,356 and 461,275. In British Patent 327,356, a conductive foil is bonded to an insulatory support and completely coated with an acid resistant material. The resist covering unwanted foil then mechanically is removed and the uncovered foil is dissolved away by an etchant.

The process of British Patent 327,356 is refined in British Patent 461,275 in that a photographic resist is applied to the metal surface in the desired pattern by a means well known to the printing and decorative arts—a process more amenable to production of complicated circuits. U.S. Patent 2,441,960 presents a somewhat more comprehensive discussion of the techniques disclosed in these earlier British patents.

While facilitating the mass production of electrical devices, the "etched" circuit has been plagued by a number of inadequacies which have prevented wider and more successful adaptation in the electrical arts. The thin foil employed, usually from one to two thousandths of an inch in thickness, is inherently frail even when affixed to its insulating backing, and is subject to rupture during handling and use. Furthermore, the provision between the insulation backing and the metal foil of a bond capable of withstanding temperatures incident commercially desirable solder dipping techniques has presented a problem of great magnitude. Even where a bond providing the necessary strength and temperature resistance has been obtained, the surface roughness of the conventional etched circuits, accentuated by the concave edges of the remaining conductive track, has rendered them unsatisfactory for use in such applications as commutators and sliding switches where contact is made and broken by a sliding stylus of switch member.

An early attempt to overcome some of these difficulties is found in British Patent 602,492, issuing in 1948. According to one suggestion therein contained, a paper sheet, impregnated with thermoplastic material and containing holes where electrical contacts are to be made, is pressed against the foil pattern following the etching step. This expedient partially embeds the foil in the insulatory support under the paper, but has little beneficial effect in the uncovered regions, leaving these contact areas rough and contaminated with the thermoplastic impregnated material. When, according to this British patent, the impregnated paper sheet is not employed, the resist is not removed prior to pressing. When, following the pressing step, the resist necessarily is removed to obtain electrical contact, the foil surface is depressed below the surface of the plastic. Accordingly, the resulting structures are wholly inadequate for use in commutators or other switching mechanisms where a smooth sliding contact is essential to operation.

In view of these and other difficulties encountered by the art, it is the principal object of this invention to provide an improved process for producing a conductive metallic pattern on an insulatory base support.

A primary object of the invention is a process for producing a conductive metallic pattern of the desired configuration and subsequently embedding such pattern in an insulatory support to provide a flush surface.

A further object of the invention is a process wherein a resist material is disposed on a thin conductive metal sheet in the desired circuit pattern, the uncovered metal is etched away and the remaining metal is pressed into a hardenable insulating material to produce a flush surface.

An additional object of the invention is a process wherein an etched circuit pattern is embedded in a hardenable insulatory support whereby the concave edges of the etched metal are disposed in interlocking relationship with the hardened insulatory support.

An important object of the invention is an improved "printed circuit" produced by the etch technique wherein a conductive metal pattern having concave undercut edges is embedded in interlocking flush, surface relationship in an insulatory base support.

Generally described, the present invention comprises a process for embedding a metallic sheet in a predetermined pattern in a base support, which comprises applying a resist to a metallic sheet in said predetermined pattern, chemically etching away the exposed portions of said sheet with a solvent for said metallic sheet which is relatively inactive toward said resist, whereby said sheet is brought to said predetermined pattern with concave edges, and pressing the remaining portions of said sheet into a hardenable plastic material whereby said material forms a base support with said remaining portions of said sheet embedded therein in mechanically interlocked relationship by virtue of said concave edges.

The particular type of conductive metal sheet or foil, the particular method of applying the resist material, the particular type of hardenable insulation or the particular etchant employed are not of critical significance in the present invention. As initially indicated, all of these variables are present in the prior "printed circuit" art, it being the object of this invention to employ these known materials in the manner herein described to obtain novel "printed circuitry" which is not characterized by many of the disadvantages of the "printed circuitry" of the prior art.

Any of the resist materials employed by the art are operable in the present invention which, depending on the process employed to apply the resist, may include printers ink, bitumens, chromate glue, fish glue, cold-top enamels, and the like. As indicated, the resist may be formed by conventional means such as by contact or offset printing, by wet or dry screening, by lithography, or by photographic processes. The insulatory support may be any hardenable insulating material such as thermosetting and thermoplastic resins, including ureaformaldehyde and melamine-formaldehyde condensation products, polystyrene, polyacrylates and methacrylates, cellulose acetate, ethyl cellulose, nylon, and the like, and may be glass or other ceramic material which is plastic at high temperature and hardens on cooling. The usual etchants such as ferric chloride, nitric acid, aqua regia, and the like, may be employed.

In a preferred embodiment of the invention, the metal sheet or foil initially is carried by a temporary support and subsequent to the etching step is transferred and embedded into the permanent insulatory support, as hereinafter more specifically described. In a further embodiment of the invention, the foil is carried at all times by the permanent support and similarly embedded therein subsequent to the etching step.

According to a preferred embodiment of the invention, a metal sheet or foil is secured to one surface of a temporary support and a photographic emulsion is applied to the exposed surface of the metal. The emulsion is then exposed to light or other emulsion activating rays in a predetermined pattern. Subsequently, the emulsion is developed and fixed leaving the activated portions of the emulsion adhering to the metal, while the nonactivated portions of the emulsion are washed away, leaving corresponding portions of the metal exposed. The exposed portions of the metal sheet are dissolved by a solvent which is relatively inactive toward the fixed emulsion after which the emulsion is removed by another solvent which is relatively inactive toward the remaining portion of the metal sheet. A hardenable plastic material is then forced against the remaining portion of the metal sheet and the now exposed portion of the temporary base to which the metal sheet adheres. The plastic material is hardened to form a permanent base and subsequently the permanent base and the metallic element are removed as a unit from the temporary support.

A "printed circuit," such as an electric impedance element, constructed in accordance with the invention, comprises in its preferred embodiment a unitary metallic element embedded in an insulating base with one surface of the metallic element flush at all points with one surface of the insulating base. This construction has many advantages over the prior art. The metallic element is, for example, securely anchored in the insulating base since it is in contact with such base on three sides thereof. This prevents so-called "banjoing" and reduces the possibility of breakage of the metallic element. Since the upper exposed surface of the metallic element is flush with one surface of the insulating base a smooth surface is thereby provided over which a movable contact can slide with a minimum of mechanical resistance. This construction of an impedance element also provides a maximum contact or association between the metallic element and the base while still providing an exposed surface of the metallic element for operation with a movable contact. The close association between the metallic element and the permanent base is desirable in many instances such as one in which the base, which may be of ceramic material, contains iron in the interest of obtaining a high inductance.

The preferred process described has numerous advantages. Among these are the ultra fine patterns which are obtainable in the metallic element, the firm locking of the metallic element in the permanent base, the clean exposed surface of the metallic element uninterrupted by creepage of the material of the permanent base over the surface thereof, the construction of the metallic element from a single solid sheet of metal, and the great complexity of pattern obtainable with relatively little increase in cost as compared to the simplest of patterns.

This invention, together with further objects and advantages thereof, will best be understood by reference to the following description of the preferred embodiment taken in connection with the accompanying drawing, and its scope will be pointed out in the appended claims.

In the drawing in which like parts are designated by like reference numerals:

Figure 3:
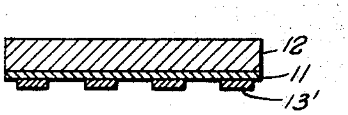
FIG. 3 is a cross-sectional view similar to FIG. 2 but showing the photographic emulsion partially removed after development and fixing.
Figure 3A:
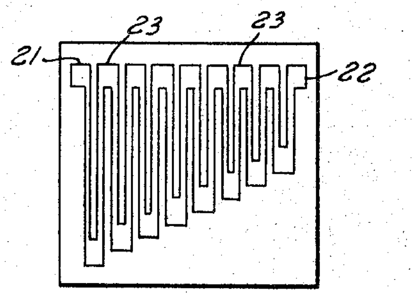

FIG. 3*a* is a plan view of the article shown in FIG. 3 showing the actual pattern of the developed and fixed photographic emulsion.

Figure 1:
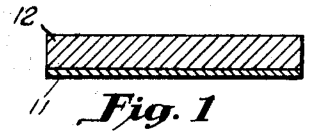
FIG. 1 is an enlarged cross-sectional view of a temporary base and a metallic sheet adhering thereto showing an initial stage of the process of this invention.
Figure 2:
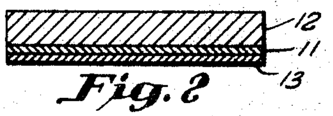
FIG. 2 is a cross-sectional view of the same article showing a photographic emulsion secured to the metallic sheet.
Figure 4:
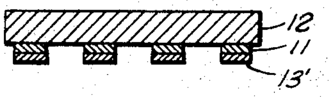
Figure 5:
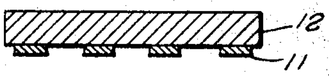

FIG. 4 is a cross-sectional view similar to FIGS. 1–3 showing the exposed portions of the metallic sheet removed by dissolving, FIG. 5 is a cross-sectional view of the same article showing the remnants of the photographic emulsion washed away.

Figure 6:
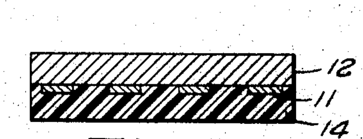

FIG. 6 is a cross-sectional view similar to FIG. 5 but showing a hardenable plastic base pressed against the metallic element and the temporary base.

Figure 7:

FIG. 7 is a cross-sectional view similar to FIG. 6 but showing the permanent base and the metallic element separated as a unit from the temporary base.

Figure 8:
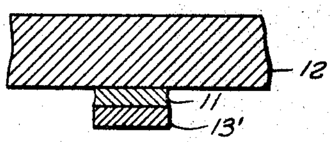

FIG. 8 is a fragmentary and enlarged view of the structure shown in FIG. 4.

Figure 9:
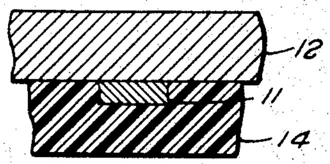

FIG. 9 is a fragmentary and enlarged view of the structure shown in FIG. 6.

According to the preferred embodiment of the invention, a metal foil or sheet 11 is secured to a temporary support 12 by any suitable means. The temporary support may be a phenolic laminated thermosetting plastic or other material and the metallic sheet 11 may, for example, be of stainless steel. In such case, the metal sheet or foil may readily be secured to the temporary support by pressing the thermosetting plastic material in an uncured state against one surface of the metal foil under conditions of heat and pressure which will cause the plastic to set. During such process it is, of course, necessary that the metal foil be suitably supported by some smooth backing surface of desired contour. The natural adherence of the plastic and the foil as a result of the plastic being cured while being pressed against the foil is sufficient to maintain the foil in close contact with the temporary support during the various operations which are to follow.

It is possible also that the metal sheet or foil 11 be secured to the temporary support 12 by a suitable separate adhesive. It will be necessary, however, that the adhesive be inactive toward one or more solvents subsequently to be employed.

With the metal sheet or foil 11 suitably adhering to the temporary support 12, a photographic emulsion 13 is applied to the exposed surface of the metal foil. This emulsion may be any emulsion commonly used in photoengraving or may be any form of coating which will protect the metal during subsequent steps of the process and which is sensitive to some form of electromagnetic radiation such as light. One satisfactory form of coating comprises primarily a solution of shellac sensitized by a bichromate solution. The resulting emulsion or coating is then exposed to emulsion activating rays such as light in some predetermined pattern. In the preferred embodiment of the invention, the pattern of light is the same as the desired ultimate configuration of the metallic element or sheet.

After exposure, the emulsion 13 is developed and fixed in the usual manner whereupon the unexposed portions of the photographic emulsion are washed away while a coating 13' remains to protect selected portions of the metal foil. This coating may be of any desired pattern as determined by the pattern of light to which the sensitized emulsion was exposed. In FIG. 3*a*, the coating 13' is shown in a pattern employed in the manufacture of a resistance element, to be described subsequently.

The portion of the foil 11 which is not protected by the coating 13' is now dissolved by a suitable solvent which is inactive toward the coating 13'. It has been found that an aqueous solution of ferric chloride is a satisfactory agent for this purpose where the metal sheet or foil, the emulsion, and the temporary support are of the materials suggested above. The concentration of the solution to be used is of course a matter of practical choice depending primarily upon the thickness of the metal and the desired speed of the operation.

The metal sheet 11 now appears on the temporary support in the predetermined pattern with the exposed surfaces still protected by the coating 13' which is the residue of the original photographic emulsion 13. This coating may now be dissolved by an agent such as a suitable organic solvent, for example alcohol, or an aklaline solution of lye or other substance. It is preferred to employ a lye solution in the particular embodiment of the invention disclosed since the lye solution also reacts with or sets the exposed surfaces of the phenolic temporary support 12 so that the latter will be less likely to adhere to the permanent base which will subsequently be pressed against these surfaces under conditions of substantial heat and pressure. As is well understood in the art, the strength of the lye solution is dependent upon the nature of the film 13', the nature of the temporary support 12, and the desired speed of operation.

A hardenable plastic 14 such as a thermosetting resin is now pressed against the surface of the temporary support 12 to which the metallic element 11 is adhering at an elevated temperature and pressure under conditions to embed the metal and flow the plastic around all of the exposed surfaces of the metal. Thereafter, the resin is cured by heat in a manner well known in the art. The adherence of the metallic sheet or foil 11 to the temporary support 12 is sufficiently great that the plastic 14 will not be forced between the contacting surfaces of the metallic foil and the temporary support and accordingly, the upper surfaces of the metallic element, as viewed in the various figures, will necessarily be substantially flush with the upper surface of the permanent base 14.

The permanent base 14 and the metallic element 11 are removed as a unit from the temporary support 12 by any one of several possible means. One of the most satisfactory means is to subject the apparatus to a thermal shock. More specifically, the entire unit is heated to an elevated temperature following which the temporary support 12 is rapidly cooled. The rapid contraction of the temporary support relative to the permanent base 14 and the metallic element 11 produces a sharp cleavage leaving the upper surface of the permanent base 14 and the upper surface of the metallic element 11 clean, smooth and flush.

FIGS. 8 and 9 illustrate the contour of the edges of the metallic element 11 following the dissolving of the portions of the sheet or foil not protected by the coating 13'. The acid or other dissolving agent employed tends to attack the exposed edges of the metallic element 11, thereby producing concave edge surfaces seen in FIGS. 8 and 9. These concave surfaces serve to anchor the metallic element firmly in the permanent base 14 as may readily be seen in FIG. 9. The bonding of the metallic element to the permanent base thereby need not depend upon surface-to-surface adherence exclusively and accordingly is much firmer than would otherwise be the case.

The process described is peculiarly well adapted to the construction of electric impedance elements such as resistors, rheostats, potentiometers and inductances. The predetermined pattern for the metallic sheet or foil illustrated in the drawing is one which may be employed in the manufacture of a resistance element for a rheostat or potentiometer. In FIG. 3*a*, showing the selected pattern in plan view, it will be noted that there is provided a relatively long thin metallic path for the transmission of electric current. Even though the metallic element is a reasonably good conductor of electricity, for example stainless steel as suggested above, the resistance of the elongated path of small cross-section is quite substantial.

At the two ends of the resistor there are provided relatively large portions 21 and 22 to which binding posts or other forms of terminals may be connected. Enlarged portions 23 along with the terminals 21 and 22 serve as stationary contacts for cooperating with a movable contact, not shown in the drawing. It is to be noted that since the stationary contacts 21, 22, and 23 comprise a relatively large area of metal foil the resistance of the metallic element in these areas is very small. Accordingly, any wearing of these portions by repeated operation of the movable contact will have negligible effect upon the total resistance of the metallic element.

Since the upper surface of the metallic element is substantially flush with the upper surface of the permanent base 14, a smooth continuous surface is provided over which the movable contact may ride. This minimizes mechanical resistance to the movement of the movable contact.

In the particular pattern of resistance element shown in FIG. 3*a*, the resistance between adjacent ones of the stationary contacts 21, 22, and 23 is made progressively smaller from left to right, a non-linear resistance element thereby being obtained. This is desirable in many applications of variable resistors and other impedance devices as is well recognized in the art.

The resistance element disclosed in FIG. 3*a* basically has very low inductance since the adjacent portions of the conducting element lie in close proximity and carry current in opposite directions. This is a desirable feature in most resistor applications. However, if an inductive impedance element is desired an inductive base may be employed comprising a suitable insulating material such as plastic or ceramic material containing minute iron particles.

An impedance element constructed in accordance with the invention has numerous additional advantages over the prior art. The surface of the element is flush with the surface of the base support, whereby a smooth even path is provided for the movable contact, and the portions of the element forming the stationary contacts are enlarged whereby the wearing thereof by the movable contact has no appreciable effect on the total resistance of the element. The element itself is unitary in construction with the result that no connections are required between sections thereof and the pattern desired can be obtained within very narrow limits.

The impedance element when produced by the process described above can be of a very fine pattern if desired. For example, the width of the strips in the resistance element illustrated in FIG. 3*a* may be on the order of .001 inch. The preferred photographic process described above enable the production of such thin strips with a high degree of accuracy and the method of embedding the metallic element in a base support as described above permits such an operation without damage to the fine metallic element and results in a clean element with the exposed surfaces flush.

Still another advantage of a resistor or other electrical device constructed in accordance with the invention is the fact that the conducting element is in contact with the base on three sides thereof. Heat is therefore readily transmitted from the conducting element to the base and the device may be operated at a higher load than would otherwise be possible.

A resistor constructed in accordance with the invention and having a high temperature coefficient of resistance is particularly well adapted to the measurement of the temperature of a surface at a selected point. This rises partially from the fact that the resistor may readily be made with fine lines of conducting material which are very closely spaced. The total area covered by the resistance element may thereby be made very small with the result that the temperature of a very small selected area may be determined. The resistance may, of course, be made of any desired shape but would preferably be substantially square if a point measurement of temperature is desired.

Another feature of such a resistor which makes it particularly well adapted to the measurement of the temperature of a surface is the fact that the resistance element may be made to lie substantially in a plane. The exposed surface of the resistor can be placed directly against the surface whose temperature is to be measured if the latter surface is nonconducting electrically. It will be apparent that excellent thermal conductivity is thereby obtained. If the surface is of metal or other conducting material, a thin layer of insulating material, such as one or more coats of varnish, can be applied to the otherwise exposed surface of the resistor to prevent shorting of the resistor without seriously affecting heat conductivity between the resistor and the surface whose temperature is to be measured.

A preferred embodiment of the invention has been described above in which a plastic temporary support 12 is used. However, it is within the scope of the invention to use any of various other materials for this support. For example, in accordance with another embodiment of the invention a metallic or other material preferably electrically conducting, is used therefor. A coating is placed directly thereon which is sensitive to light or other electromagnetic radiation. This coating is then subjected to such radiation but in reverse or negative form. That is, the area surrounding the ultimate position of the desired metallic element is activated while the remainder of the coating is not.

After the coating has been developed and set, the surface of the temporary support on which the selectively patterned coating appears is plated to the desired thickness with a metal which will ultimately constitute the desired metallic element. It will be appreciated that the plating will be effective only in the areas not covered by the coating. The remainder of the emulsion or light sensitive coating is then removed and the permanent base material applied under conditions of heat and pressure as described above in connection with the preferred embodiment of the invention. After the base material is propertly hardened, the base and the sheet-like metallic element resulting from the plating may be removed as a unit from the temporary support by any suitable means such as by thermal shock.

As indicated, flush "printed circuits," according to a further embodiment of the invention, also may be produced without employing a temporary support. The following procedure exemplifies this embodiment.

A copper foil approximately .001 inch in thickness was bonded to a paper-base phenolic laminate by means of a rubber cement and pressed between polished stainless steel plates in a laminating press at a temperature of 300° F. under a pressure of 500 p.s.i. for 30 minutes. The laminate then was cooled under pressure for 30 minutes until the temperature fell below 100° F.

The copper surface was cleaned with pumice and coated in a conventional photo-engraving whirler with a photosensitive cold-top composition comprising a shellac-bichromate solution. When the cold-top composition had dried, a negative type transparency of a radiosonde baroswitch commutator was placed against the photo-sensitized surface and exposed before a 35 amp. carbon arc lamp for five minutes at distance of three feet. After development in alcohol, the unexposed areas were washed away. After the positive resist pattern had dried, the exposed copper was etched away with a 42° Baumé solution of ferric chloride. The resist then was removed with dilute caustic.

When dry, the resulting "printed circuit" with its undercut printed foil pattern was pressed between polished stainless steel plates for 30 minutes at a temperature of 300° F. and under a pressure of 500 p.s.i.—then allowed to cool to below 100° F. before pressure was released. The foil pattern was embedded in the plastic with substantially flush interlocking relationship. The resulting commutator performed successfully in a radiosonde baroswitch under operating conditions.

While particular embodiments of the invention have been shown, it will be understood, of course, that the invention is not limited thereto since many modifications may be made, and it is therefore contemplated to cover by the appended claims any such modifications as fall within the true spirit and scope of the invention.

This application is a continuation-in-part of application Serial No. 577,614, filed April 11, 1956, now abandoned, which in turn was a continuation of application Serial No. 189,850, filed October 12, 1950 now abandoned.

The invention having thus been described, what is claimed and desired to be secured by Letters Patent is:

1. A process for embedding a metallic sheet in a predetermined pattern in a base support, which comprises applying a resist to a metallic sheet in said predetermined pattern, chemically etching through the exposed portions of said sheet with a solvent for said metallic sheet which is relatively inactive toward said resist, whereby said sheet is brought to said predetermined pattern with recessed concave edges, and embedding the remaining portions of said sheet in hardenable plastic material, said plastic material being made flush with said remaining portions of said sheet, whereby said plastic material forms a base support with said remaining portions of said sheet embedded therein in mechanically interlocked relationship by virtue of said recessed concave edges.

2. A process for embedding a metallic sheet in a predetermined pattern in a base support which comprises temporarily adhering a metallic sheet to a supporting surface, applying a photographic emulsion coating to the exposed surface of said sheet, exposing said emulsion to emulsion activating rays in said predetermined pattern, developing and fixing said emulsion whereby a photographic coating in said predetermined pattern overlies said sheet and protects it against solvent dissolution, chemically etching through said metallic sheet in those areas unprotected by said coating with a solvent inactive toward said coating, thereafter dissolving said coating with a solvent inactive toward the metal of said sheet whereby said sheet is arranged in said pattern, pressing a hardenable plastic material onto said pattern and supporting surface whereby to embed said sheet within said material, hardening said material to form said base support, and separating the base support and metal sheet as a unit from said supporting surface.

3. A process for embedding a metallic sheet in a predetermined pattern in a base support which comprises temporarily adhering a metallic sheet to a thermosetting plastic supporting surface by holding said sheet and said plastic in contact while said plastic is cured, applying a photographic emulsion coating to the exposed surface of said sheet, exposing said emulsion to emulsion activating rays in said predetermined pattern, developing and fixing said emulsion whereby a photographic coating in said predetermined pattern overlies said sheet and protects it against solvent dissolution, chemically etching through said metallic sheet in those areas unprotected by said coating with a solvent relatively inactive toward said coating, thereafter dissolving said coating with a solvent relatively inactive toward the metal of said sheet whereby said sheet is arranged in said pattern, pressing a thermosetting plastic material onto said pattern and supporting surface whereby to embed said sheet within said material, curing said material to form said base support, and separating the base support and metal sheet as a unit from said supporting surface.

4. A process for embedding a metallic sheet in a predetermined pattern in a permanent base support of thermosetting plastic which comprises temporarily adhering a metallic sheet to a thermosetting plastic supporting surface by holding said sheet and said plastic in contact while said plastic is cured, applying a photographic emulsion coating to the exposed surface of said sheet, exposing said emulsion to emulsion activating rays in said predetermined pattern, developing and fixing said emulsion whereby a photographic coating in said predetermined pattern overlies said sheet and protects it against solvent dissolution, chemically etching through said metallic sheet in those areas unprotected by said coating with a solvent relatively inactive toward said coating, thereafter subjecting said coating and the exposed portion of said supporting surface to a lye solution, thereby simultaneously dissolving said coating, whereby said sheet is arranged in said pattern, and setting the exposed surface of said temporary support and reducing the tendency of the subsequently applied thermosetting plastic to adhere thereto, pressing a thermosetting plastic material onto said pattern and supporting surface whereby to embed said sheet within said material, curing said material to form said base support, and separating the base support and metal sheet as a unit from said supporting surface.

5. A process for embedding a metallic sheet in a predetermined pattern in a base support, which comprises temporarily adhering a metallic sheet to a temporary supporting surface, applying a resist to said sheet in said predetermined pattern, chemically etching through the exposed portions of said sheet with a solvent for said metallic sheet which is relatively inactive toward said resist, whereby said sheet is brought to said predetermined pattern with recessed concave edges, applying a hardenable plastic material against the exposed portions of said sheet and the exposed portions of said temporary supporting surface thereby forming a base support with the remaining portions of said sheet embedded therein in mechanically interlocked relationship by virtue of said concave edges, and removing said sheet and said base support from said temporary supporting surface after hardening of said plastic material.

6. A process for embedding a metallic sheet in a predetermined pattern in a base support, which comprises temporarily adhering a metallic sheet to a temporary supporting surface, applying a resist to said sheet in said predetermined pattern, chemically etching through the exposed portions of said sheet with a solvent for said metallic sheet which is relatively inactive toward said resist, whereby said sheet is brought to said predetermined pattern with recessed concave edges, removing said resist from the remainder of said sheet, applying a hardenable plastic material against the exposed portions of said sheet and the exposed portions of said temporary supporting surface thereby forming a base support with the remaining portions of said sheet embedded therein in mechanically interlocked relationship by virture of said concave edges, and removing said sheet and said base support from said temporary supporting surface after hardening of said plastic material.

7. A process for producing a "printed circuit" having in combination a substantially flush pattern of conductive metallic foil supported on an insulating backing which comprises providing a laminate comprising a metallic foil and a heat softenable, insulating backing, applying a resist material to the foil surface in the desired circuit pattern, applying an etchant to the foil in the areas uncovered by resist until the exposed foil is removed and the edges of the foil area covered by resist are undercut in a generally concave configuration, and pressing the foil pattern against the backing under heat and pressure to embed the foil in the backing in substantially flush interlocking relationship.

8. A "printed circuit" comprising a thin conductive metallic circuit pattern including at least two terminal portions for effecting an electrical connection and having etched undercut, generally concave edges embedded in a hardened insulatory support with one surface of the foil substantially flush with one surface of the support and with the concave metallic edges disposed in interlocking relationship with the support.

References Cited in the file of this patent

UNITED STATES PATENTS

| | | |
|---|---|---|
| 1,377,506 | Novotony | May 10, 1921 |
| 1,963,834 | Decker | June 19, 1934 |
| 2,355,949 | Boutwell | Aug. 15, 1944 |
| 2,441,960 | Eisler | May 25, 1948 |
| 2,447,541 | Sabee | Aug. 24, 1948 |
| 2,506,604 | Lokker et al. | May 9, 1950 |
| 2,585,700 | Strickman | Feb. 12, 1952 |
| 2,600,343 | Tuttle | June 10, 1952 |
| 2,695,351 | Beck | Nov. 23, 1954 |
| 2,706,697 | Eisler | Apr. 19, 1955 |
| 3,042,591 | Cado | July 3, 1962 |

FOREIGN PATENTS

| | | |
|---|---|---|
| 19,919 | Great Britain of 1892 | Nov. 4, 1893 |